US012775416B2

(12) United States Patent
Su et al.

(10) Patent No.: US 12,775,416 B2
(45) Date of Patent: Oct. 27, 2026

(54) METHOD AND APPARATUS TO REDUCE LATENCY FOR RANDOM READ WORKLOADS IN A SOLID STATE DRIVE

(71) Applicant: SK Hynix NAND Product Solutions Corp., Rancho Cordova, CA (US)

(72) Inventors: Holman Su, West Sacramento, CA (US); Mark Anthony Golez, Folsom, CA (US); Sarvesh Varakabe Gangadhar, San Jose, CA (US); David J. Pelster, Longmont, CO (US)

(73) Assignee: Solidigm Inc., Rancho Cordova, CA (US)

( * ) Notice: Subject to any disclaimer, the term of this patent is extended or adjusted under 35 U.S.C. 154(b) by 78 days.

(21) Appl. No.: 17/536,956

(22) Filed: Nov. 29, 2021

(65) Prior Publication Data

US 2022/0083280 A1 Mar. 17, 2022

(51) Int. Cl.
*G06F 3/06* (2006.01)
*G06F 12/10* (2016.01)

(52) U.S. Cl.
CPC .......... *G06F 3/0659* (2013.01); *G06F 3/0608* (2013.01); *G06F 3/0611* (2013.01); *G06F 3/0652* (2013.01); *G06F 3/068* (2013.01); *G06F 12/10* (2013.01)

(58) Field of Classification Search
CPC .... G06F 3/0652; G06F 3/0659; G06F 3/0608; G06F 3/0688; G06F 12/10; G06F 3/068; G06F 3/06; G06F 3/0611
USPC ................. 711/103, E12.008, E12.012, 100, 711/E12.009, E12.001, E12.002, E12.006, 711/158
See application file for complete search history.

(56) References Cited

U.S. PATENT DOCUMENTS

| | | | | |
|---|---|---|---|---|
| 11,449,232 | B1 * | 9/2022 | Kannan | G11C 16/10 |
| 2006/0253645 | A1 * | 11/2006 | Lasser | G06F 11/1441 711/E12.008 |
| 2008/0177936 | A1 * | 7/2008 | Lasser | G06F 12/0246 711/E12.002 |
| 2014/0281338 | A1 * | 9/2014 | Choi | G06F 3/0688 711/170 |
| 2019/0324683 | A1 | 10/2019 | Li et al. | |
| 2020/0012451 | A1 * | 1/2020 | Benisty | G06F 13/4282 |
| 2020/0042181 | A1 * | 2/2020 | Lee | G06F 3/0616 |
| 2020/0042250 | A1 * | 2/2020 | Oh | G06F 3/0611 |

(Continued)

*Primary Examiner* — Jared I Rutz
*Assistant Examiner* — Edward Waddy, Jr.
(74) *Attorney, Agent, or Firm* — HG LAW LLP

(57) ABSTRACT

Read Quality of Service (rQoS) in the solid state drive is improved by reducing latency for host random read workloads. Host read operations for random read workloads are prioritized in the solid state drive over program operations for garbage collection to reduce latency for random read workloads. The program time (tProg) and other associated latencies such as program-suspend-resume overhead, and firmware process overhead to dispatch the program are minimized by minimizing the number of program commands used for garbage collection while the solid state drive is performing read operations for a random read workload for a host read operation, allowing the solid state drive to prioritize host read operations for random read workloads while ensuring that there is no impact to the amount of written data that is on the solid state drive.

20 Claims, 5 Drawing Sheets

(56) References Cited

U.S. PATENT DOCUMENTS

| | | | | |
|---|---|---|---|---|
| 2020/0133571 | A1* | 4/2020 | Kim | G06F 12/10 |
| 2020/0310690 | A1* | 10/2020 | Annavaram | G06F 3/0659 |
| 2020/0310968 | A1* | 10/2020 | Kim | G06F 12/0246 |
| 2021/0149597 | A1* | 5/2021 | Kim | G06F 3/0679 |
| 2021/0182190 | A1* | 6/2021 | Gao | G06F 12/0246 |
| 2021/0247937 | A1 | 8/2021 | Angoth et al. | |
| 2022/0027085 | A1* | 1/2022 | Porzio | G06F 3/0659 |

* cited by examiner

METHOD AND APPARATUS TO REDUCE LATENCY FOR RANDOM READ WORKLOADS IN A SOLID STATE DRIVE

FIELD

This disclosure relates to solid state drives and in particular to read quality of service of a solid state drive.

BACKGROUND

Non-volatile memory refers to memory whose state is determinate even if power is interrupted to the device. A solid state drive is a storage device that stores data in non-volatile memory. Typically, the solid-state drive includes a block-based memory such as NAND Flash and a controller to manage read/write requests received from a host communicatively coupled to the solid state drive directed to the NAND Flash.

When data stored in a block in a NAND Flash in the solid state drive is no longer needed, data must be erased before one or more blocks storing the data can be used to store new data. Prior to erasing, valid data in the one or more blocks must be written (programmed) to other blocks in the NAND Flash. The writing of the valid data to other blocks and the NAND Flash erase operation are typically referred to as "garbage" collection (garbage-collection). Garbage collection operations include writing valid pages to other blocks in NAND Flash and erasing blocks in NAND Flash after valid pages have been rewritten to other blocks in NAND Flash.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
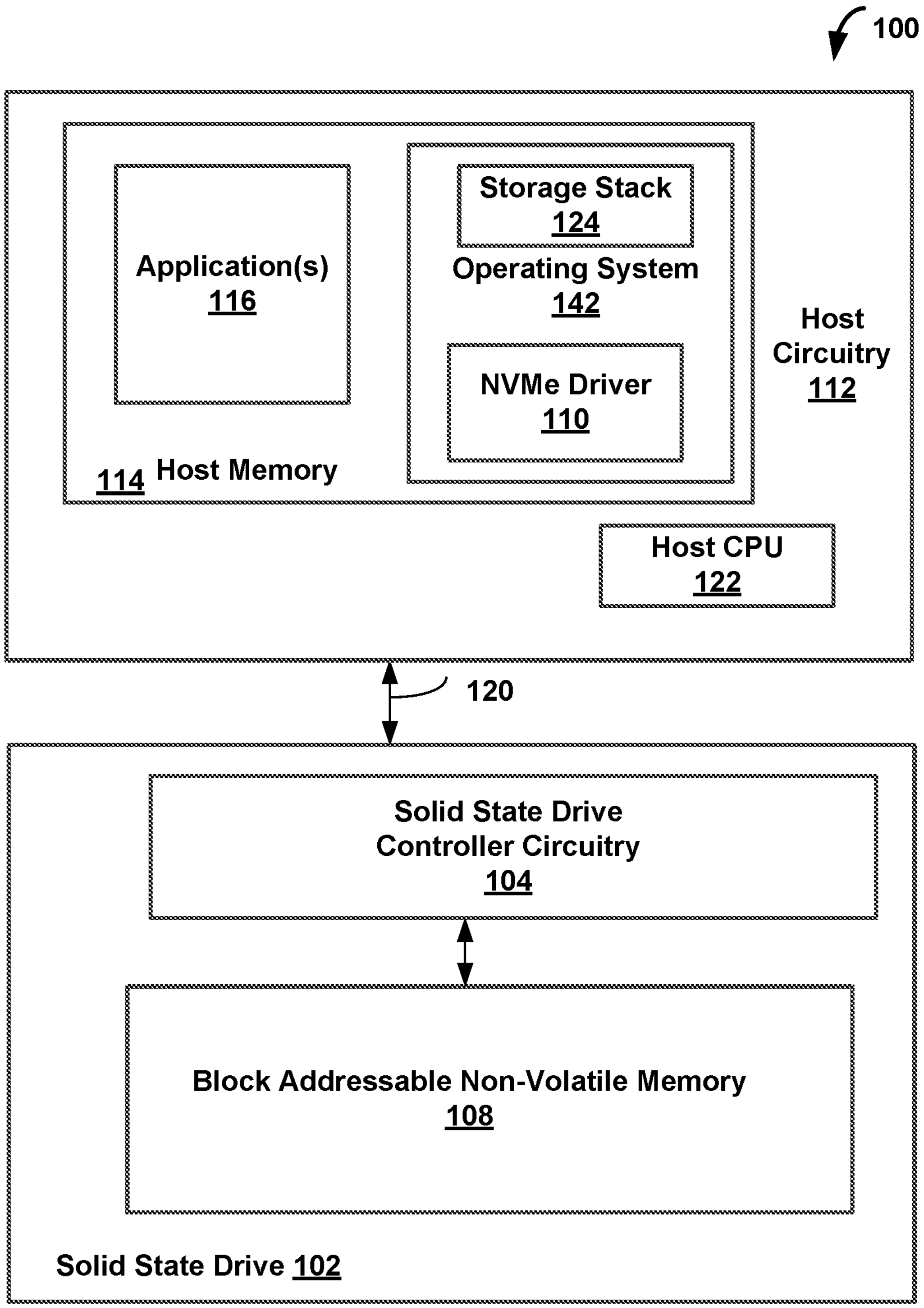
FIG. 1 is a block diagram of a computer system that includes host circuitry communicatively coupled to a solid state drive.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

A host system can communicate with a solid state drive (SSD) over a high-speed serial computer expansion bus, for example, a Peripheral Component Interconnect Express (PCIe) bus using a Non-Volatile Memory Express (NVMe) standard protocol. The Non-Volatile Memory Express (NVMe) standard protocol defines a register level interface for host software to communicate with the solid state drive over the Peripheral Component Interconnect Express (PCIe) bus.

The solid state drive can receive Input/Output (I/O) requests from the host system at indeterminate times to perform read and program operations in the NAND memory. The I/O requests can be mixed bursts of read operations and write operations, of varying sizes, queue-depths, and randomness interspersed with idle periods. The processing of the read and program commands for the NAND memory are intermingled internally in the solid state drive with various error handling and error-prevention media-management policies. These, together, with the varying number of invalid pages in NAND in the solid state drive, makes the internal data-relocations/garbage-collections (GC) in the solid state drive bursty (active periods intermingled with idle periods).

An enterprise SSD (also referred to as a data center SSD) can be used by read-intensive applications such as web hosting, cloud computing, meta-data search acceleration and data center virtualization and applications that require high I/O performance. Applications that require high I/O performance include On-line Transaction Processing (OLTP) that use small block random workloads. A 4 Kilo Byte (KB) block size is an example of a small block.

Time to perform a program operation in the NAND die is much longer than the time to perform a read operation in the NAND die. A Program Suspend Resume (PSR) feature in the solid state drive allows suspension of an ongoing program operation to service a read operation, however the Program Suspend Resume increases the time required to complete the program operation. Read requests that are queued behind program requests result in a higher read QoS (rQoS) at the 99.99 percentile level.

While the host system is performing host read operations in the solid state drive, garbage collection in the solid state drive can be deferred to minimize impact to read latency due to the reduction in the number of blocks in the NAND dies on the solid state drive needed for host program operations.

Disabling background programs for garbage collection during a random read workload improves random read latency by removing the effective program time (tProg) impact. However, disabling background programs completely could reduce the amount of available unwritten blocks in NAND which could eventually lead to a solid state drive prioritizing garbage collection over host read and host write operations.

In an embodiment, read Quality of Service (rQoS) in the solid state drive is improved by reducing latency for host random read workloads. Host read operations for random read workloads are prioritized in the solid state drive over program operations for garbage collection to reduce latency for random read workloads.

The program time (tProg) and other associated latencies such as program-suspend-resume overhead, and firmware process overhead to dispatch the program are minimized by minimizing the number of program commands used for garbage collection while the solid state drive is performing read operations for a random read workload for a host read operation. Thus, allowing the solid state drive to prioritize host read operations for random read workloads while ensuring that there is no impact to the amount of written data that is on the solid state drive.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 1 is a block diagram of a computer system 100 that includes host circuitry 112 communicatively coupled to a solid state drive 102. The host circuitry 112 (also referred to as a host system) includes a host memory 114 and a host Central Processing Unit (CPU) 122. One or more applications 116 (programs that perform a particular task or set of tasks) and an operating system 142 that includes a storage stack 124 and an NVMe driver 110 may be stored in host memory 114.

An operating system 142 is software that manages computer hardware and software including memory allocation and access to Input/Output (I/O) devices. Examples of operating systems include Microsoft® Windows®, Linux®, iOS® and Android®. In an embodiment for the Microsoft® Windows® operating system, the storage stack 124 may be a device stack that includes a port/miniport driver for the solid state drive 102.

The host circuitry 112 can communicate with the solid state drive 102 over a high-speed serial computer expansion bus 120, for example, a Peripheral Component Interconnect Express (PCIe) bus. The host circuitry 112 manages the communication over the Peripheral Component Interconnect Express (PCIe) bus. In an embodiment, the host system communicates over the Peripheral Component Interconnect Express (PCIe) bus using a Non-Volatile Memory Express (NVMe) standard protocol. The Non-Volatile Memory Express (NVMe) standard protocol defines a register level interface for host software to communicate with the Solid State Drive (SSD) 102 over the Peripheral Component Interconnect Express (PCIe) bus. The NVM Express standards are available at www.nvmexpress.org. The PCIe standards are available at pcisig.com.

The solid state drive 102 includes solid state drive controller circuitry 104, and a block addressable non-volatile memory 108. A request to read data stored in block addressable non-volatile memory 108 in the solid state drive 102 may be issued by one or more applications 116 (programs that perform a particular task or set of tasks) through the storage stack 124 in an operating system 142 to the solid state drive controller circuitry 104.

The solid state drive controller circuitry 104 in the solid state drive 102 queues and processes commands (for example, read, write ("program"), erase commands received from the host circuitry 112 to perform operations in the block addressable non-volatile memory 108. Commands received by the solid state drive controller circuitry 104 from the host interface circuitry 202 can be referred to as Host Input/Output (I/O) commands.

Figure 2:
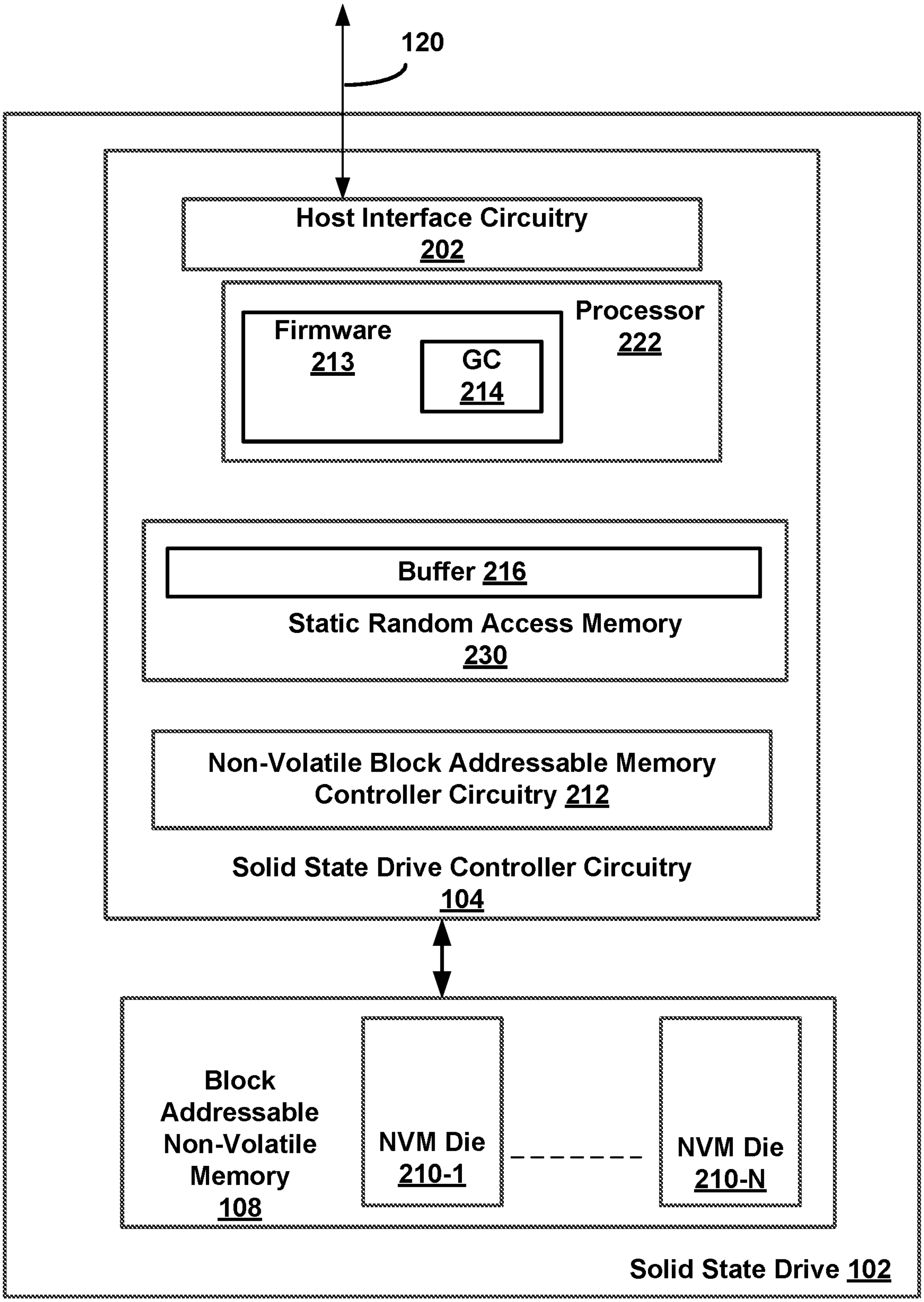
FIG. 2 is a block diagram of an embodiment of the solid state drive shown in FIG. 1.

FIG. 2 is a block diagram of an embodiment of the solid state drive 102 in FIG. 1. The solid state drive controller circuitry 104 in the solid state drive 102 includes host interface circuitry 202, non-volatile block addressable memory controller circuitry 212, a processor 222, firmware 213 and Static Random Access Memory 230.

Static Random Access Memory (SRAM) is a volatile memory. Volatile memory is memory whose state (and therefore the data stored in it) is indeterminate if power is interrupted to the device. SRAM is a type of volatile memory that uses latching circuitry to store each bit. SRAM is typically used as buffer memory because in contrast to Dynamic Random Access Memory (DRAM), the data stored in SRAM does not need to be periodically refreshed.

Firmware 213 can be executed by processor 222. Firmware 213 includes garbage collection 214 that includes background programs for garbage collection operations. Garbage collection operations include writing valid pages to other blocks in NAND Flash and erasing blocks in NAND Flash after valid pages have been rewritten to other blocks in NAND Flash.

The solid state drive controller circuitry 104 can be included in a Field Programmable Gate Array (FPGA) or an Application Specific Integrated Circuit (ASIC). Firmware 213 can be executed by processor 222. A portion of the static random access memory 230 can be allocated by firmware 213 as a buffer 216.

The block addressable non-volatile memory 108 is a non-volatile memory. A non-volatile memory (NVM) device is a memory whose state is determinate even if power is interrupted to the device. In one embodiment, the Block Addressable non-volatile memory 108 is a NAND Flash memory, or more specifically, multi-threshold level NAND flash memory (for example, Single-Level Cell ("SLC"), Multi-Level Cell ("MLC"), Tri-Level Cell ("TLC"), Quad-Level Cell ("QLC"), Penta-Level Cell ("PLC") or some other NAND Flash memory).

The block addressable non-volatile memory 108 includes a plurality of non-volatile memory dies 210-1, . . . 210-N, for example a NAND Flash die.

The non-volatile memory on each of the plurality of non-volatile memory dies 210-1, . . . , 210-N includes a plurality of blocks, with each block including a plurality of pages. Each page in the plurality of pages to store data and associated metadata. In an embodiment, the non-volatile memory die has 2048 blocks, each block has 64 pages, and each page can store 2048 bytes of data and 64 bytes of metadata.

NAND memory must be erased before new data can be written which can result in additional NAND operations to move data from a block of NAND memory prior to erasing the block. These additional NAND operations produce a multiplying effect that increases the number of writes required, producing an "amplification" effect, that is referred to as "write amplification." For example, if 3 of 64 pages in a block are valid (in use) and all other pages are invalid (no longer in use), the three valid pages must be written to another block prior to erasing the block resulting in three write page operations in addition to the erase operation and the new data to be written. Write amplification factor is a numerical value that represents the amount of data that the solid state drive controller circuitry 212 has to write in relation to the amount of new data to be written that is received from the host circuitry 112.

A TRIM command can be issued by the operating system 142 to inform the solid state drive which pages in the blocks of data are no longer in use and can be marked as invalid. The TRIM command allows the solid state drive 102 to free up space for writing new data to the block addressable non-volatile memory 108. Similarly, overwrites also invalidate previously written data and require relocations to free invalid pages. The solid state drive 102 does not relocate pages marked as invalid to another block in the block addressable non-volatile memory during garbage collection.

The Non-Volatile Block Addressable Memory Controller Circuitry 212 in the solid state drive controller circuitry 104 queues and processes commands (for example, read, write ("program"), erase commands) received from the host system for the block addressable non-volatile memory 108. Data associated with host I/O commands, for example, host read and host write commands received over the PCIe bus 120 from host circuitry 112 are stored in buffer 216.

In an embodiment, the solid state drive 102 has an Enterprise and Data Center SSD Form Factor (EDSFF) and includes 124 or more NAND dies.

Figure 3:
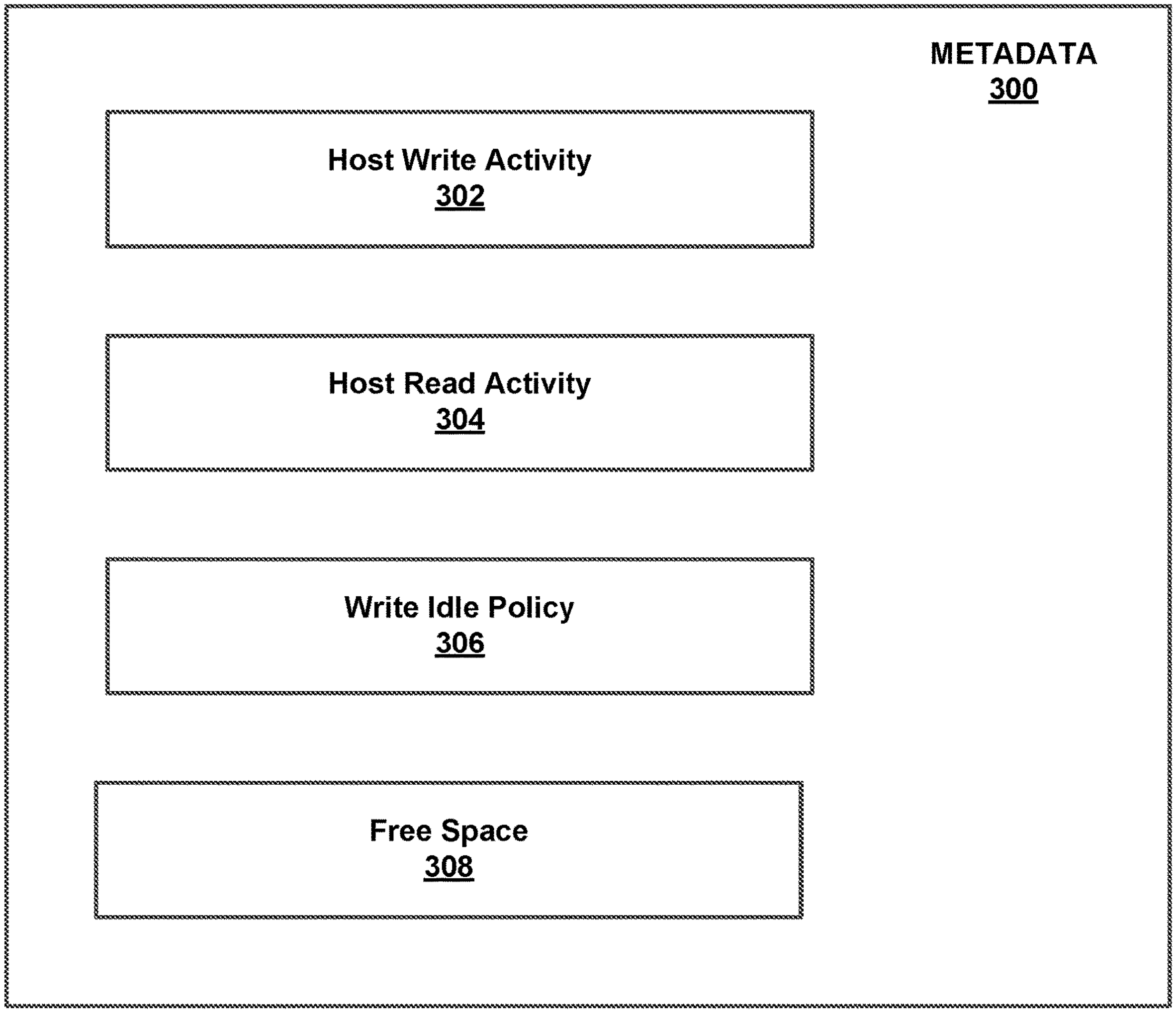
FIG. 3 is a block diagram of metadata in the solid state drive that includes counters and registers used to prioritize host read operations for random read workloads in the solid state drive over program operations for garbage collection to reduce latency for host random read workloads.

FIG. 3 is a block diagram of metadata 300 in firmware 213 used by garbage collection 214 in the solid state drive 102. The metadata 300 includes counters and flags (for example, one or more bits in a register) used to control access to the non-volatile memory dies and to prioritize host read operations for random read workloads in the solid state drive over program operations for garbage collection to reduce latency for host random read workloads.

The metadata 300 includes firmware flags and firmware counters for host write activity 302, firmware flags and counters for host read activity 304, firmware flags and counters for write idle policy 306 and firmware flags and counters for amount of free space available 308 (for example, the number of NAND blocks in NAND dies that are not used) in the solid state drive 102.

Host write activity in the solid state drive 102 includes writing data received from the host circuitry 112 to blocks in non-volatile memory dies 210-1, . . . , 210-N in Block Addressable Non-Volatile Memory 108 in the solid state drive 102. Metadata for host write activity 302 includes a host write idle detected flag (a bit set to logic '1' or logic '0') and a host write counter that is incremented for each host write that is processed. The host write idle detected flag is set to logic '1' if the host write counter has not been incremented (for example, the value that is read from the host write counter at two different times is the same) indicating that host write commands are not being processed.

Host read activity in the solid state drive 102 includes reading data in response to a host read request received from the host circuitry 112, from blocks in non-volatile memory dies 210-1, . . . , 210-N in Block Addressable Non-Volatile Memory 108 in the solid state drive 102. Metadata for host read activity 304 includes a host read idle detected flag (a bit that is set to logic '1' or logic '0') and a host read counter that is incremented for each host read that is processed. The host read idle detected flag is set to logic '1' if the host read counter has not been incremented (for example, the value that is read from the host read counter at two different times is the same) indicating that host read commands are not being processed.

Metadata for write idle policy 306 includes flags and counters that are used to determine if free space 308 (for example, a number of unused blocks in the plurality of non-volatile memory dies 210-1, . . . 210-N) on the solid state drive is below a threshold amount. Metadata for free space 308 includes a counter that tracks free blocks (available unwritten blocks) in the non-volatile memory dies 210-1, . . . 210-N and a flag that is set (bit set to logic '1' if the free space is above a threshold to allow host reads to be prioritized over garbage collection.

The write idle policy 306 and the free space 308 are used to balance host reads and garbage collection programs. Host reads are prioritized by pausing garbage collection programs to replenish the number of available unwritten blocks.

The garbage collection 214 dynamically enables and disables garbage collection programs such that program operations for garbage collection slowly continue to be performed while ensuring there is a sufficient number of unwritten (empty) blocks available in the NAND dies in the solid state drive 102.

The garbage collection 214 also ensures that there is a sufficient number of unwritten blocks available in the NAND dies to allow the solid state drive 102 to perform read and write operations at an optimal rate. A sufficient number of unwritten blocks is a number of unwritten blocks in the NAND die(s) in the solid state drive 102 to perform both host writes and background writes for garbage collection in the NAND die(s).

Host write activity 302 includes a program counter that is used to track the number of programmed blocks of non-volatile memory in the non-volatile memory dies in the solid state drive 102. The blocks can be programmed with data received via a host write command or when relocating data from other blocks of non-volatile memory during a garbage collection operation.

A program counter (counter that tracks a number of blocks written in the NAND dies in the solid state drive 102) is used to determine when to enable garbage collection while prioritizing host read operations for random read workloads in the solid state drive 102. When there has been no change to the number of programmed blocks in the NAND dies in the solid state drive 102, host read activity is prioritized over garbage collection to free programmed blocks in the NAND dies and relocate data to other blocks in the NAND dies in the solid state drive 102. Garbage collection is enabled if there is an increase in the number of blocks that are programmed (written) in the NAND dies on the solid state drive 102.

Figure 4:
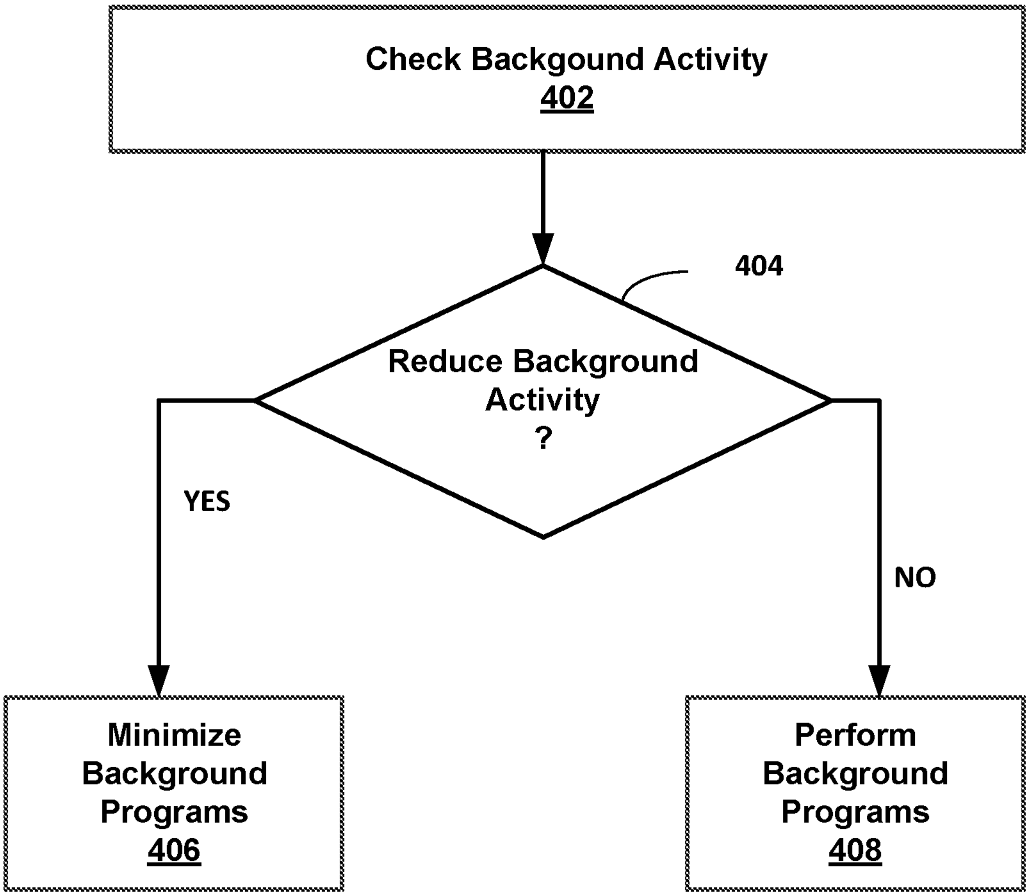
FIG. 4 is a flowgraph of a method to prioritize host read operations for random read workloads in the solid state drive over program operations for garbage collection to reduce latency for host random read workloads.

FIG. 4 is a flowgraph of a method performed in garbage collection 214 to prioritize host read operations for random read workloads in the solid state drive 102 over program operations to reduce latency for host random read workloads.

Counters and flags in garbage collection 214 are used to track host read operations received by the solid state drive controller circuitry 104 from the host circuitry 112 to read data from the solid state drive 102. A sequence of host read commands for host read operations can be sequential (consecutive logical addresses) or random (non-consecutive logical addresses) for random read workloads. Garbage collection 214 in solid state drive controller circuitry 104 to track logical block addresses included in host read commands received from the host circuitry 112 to determine if a host read command for a host read operation is for a random read workload. The logical block addresses are included in received host read commands.

At block 402, check host write activity, host read activity, write idle policy and amount of free space available on the solid state drive 102 to determine if background program commands for garbage collection 214 are to be paused.

Host write activity is checked by reading metadata for host write activity 302 to determine if there are write operations in progress in the solid state drive 102 for host write workloads. Host write activity is true if there are no ongoing host write operations.

Host read activity is checked by reading metadata for host read activity 304 to determine if there are read operations in progress in the solid state drive 102 for host read workloads. Host read activity is true if there are ongoing host read operations.

Write idle policy and free space is checked by reading metadata for write idle policy 306 and metadata for free space 308 to determine if free space (for example, a number of unused blocks in the plurality of non-volatile memory dies 210-1, . . . 210-N) on the solid state drive is below a threshold amount.

If the free space is less than prior free space by the threshold amount, the program operations for garbage collection (also referred to as background programs) can be paused. Write idle policy is true if free space is above the threshold amount.

At block 404, based on the result of the checks performed in block 402. If all the checks are true, processing continues with block 402 to minimize background programs used for garbage collection 214.

At block 406, background programs performed by garbage collection 214 are minimized by reducing the frequency of background programs. For example, garbage collection 214 can increase the time period between background programs for garbage collection from microseconds to seconds.

At block 408, background programs continue to be performed by garbage collection 214 to reclaim blocks in NAND dies 210-1, . . . , 210-N that store data received from host circuitry 112 that is no longer valid.

Figure 5:
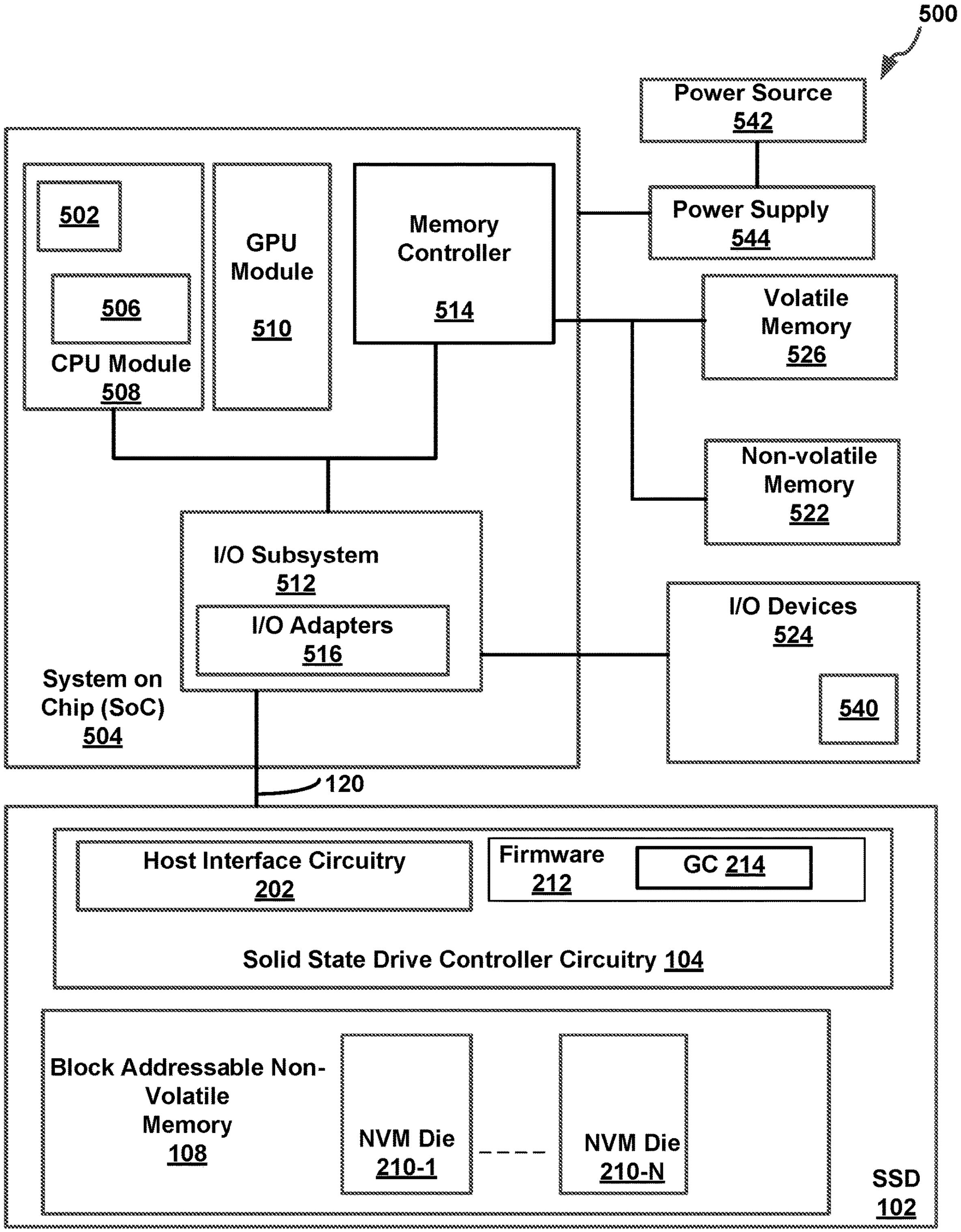
FIG. 5 is a block diagram of an embodiment of a computer system that includes the solid state drive.

FIG. 5 is a block diagram of an embodiment of a computer system 500 that includes the solid state drive 102. Computer system 500 can correspond to a computing device including, but not limited to, a server, a workstation computer, a desktop computer, a laptop computer, and/or a tablet computer.

The computer system 500 includes a system on chip (SOC or SoC) 504 which combines processor, graphics, memory, and Input/Output (I/O) control logic into one SoC package. The SoC 504 includes at least one Central Processing Unit (CPU) module 508, a memory controller 514 that can be coupled to volatile memory 526 and/or non-volatile memory 522, and a Graphics Processor Unit (GPU) 510. In other embodiments, the memory controller 514 can be external to the SoC 504. The CPU module 508 includes at least one processor core 502 and a level 2 (L2) cache 506.

Although not shown, each of the processor core(s) 502 can internally include one or more instruction/data caches, execution units, prefetch buffers, instruction queues, branch address calculation units, instruction decoders, floating point units, retirement units, etc. The CPU module 508 can correspond to a single core or a multi-core general purpose processor, such as those provided by Intel® Corporation, according to one embodiment.

The Graphics Processor Unit (GPU) 510 can include one or more GPU cores and a GPU cache which can store graphics related data for the GPU core. The GPU core can internally include one or more execution units and one or more instruction and data caches. Additionally, the Graphics Processor Unit (GPU) 510 can contain other graphics logic units that are not shown in FIG. 5, such as one or more vertex processing units, rasterization units, media processing units, and codecs.

Within the I/O subsystem 512, one or more I/O adapter(s) 516 are present to translate a host communication protocol utilized within the processor core(s) 502 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 516 can communicate with external I/O devices 524 which can include, for example, user interface device(s) including a display and/or a touch-screen display 540, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

The I/O adapter(s) 516 can also communicate with a solid-state drive ("SSD") 102 which includes solid state drive controller circuitry 104, host interface circuitry 202 and block addressable non-volatile memory 108 that includes one or more non-volatile memory dies 210-1, . . . 210-N. The solid state drive controller circuitry 104 includes firmware 213, garbage collection 214 and host interface circuitry 202.

The I/O adapters 516 can include a Peripheral Component Interconnect Express (PCIe) adapter that is communicatively coupled using the NVMe (NVM Express) over PCIe (Peripheral Component Interconnect Express) protocol over bus 120 to the host interface circuitry 202 in the solid state drive 102.

Volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, JESD79-4, originally published in September 2012 by JEDEC), DDRS (DDR version 5, JESD79-5, originally published in July 2020), LPDDR3 (Low Power DDR version 3, JESD209-3B, August 2013 by JEDEC), LPDDR4 (LPDDR version 4, JESD209-4, originally published by JEDEC in August 2014), LPDDR5 (LPDDR version 5, JESD209-5A, originally published by JEDEC in January 2020), WI02 (Wide Input/Output version 2, JESD229-2 originally published by JEDEC in August 2014), HBM (High Bandwidth Memory, JESD235, originally published by JEDEC in October 2013), HBM2 (HBM version 2, JESD235C, originally published by JEDEC in January 2020), or HBM3 (HBM version 3 currently in discussion by JEDEC), or others or combinations of memory technologies, and technologies based on derivatives or extensions of such specifications. The JEDEC standards are available at www.jedec.org.

An operating system 142 is software that manages computer hardware and software including memory allocation and access to I/O devices. Examples of operating systems include Microsoft® Windows®, Linux®, iOS® and Android®.

Power source 542 provides power to the components of system 500. More specifically, power source 542 typically interfaces to one or multiple power supplies 544 in system 500 to provide power to the components of system 500. In one example, power supply 544 includes an AC to DC (alternating current to direct current) adapter to plug into a wall outlet. Such AC power can be renewable energy (e.g., solar power) power source 542. In one example, power source 542 includes a DC power source, such as an external AC to DC converter. In one example, power source 542 or power supply 544 includes wireless charging hardware to charge via proximity to a charging field. In one example, power source 542 can include an internal battery or fuel cell source.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

The invention claimed is:

1. A solid state drive comprising:

non-volatile memory dies to store data; and controller circuitry in the solid state drive to;

receive commands to perform operations in the solid state drive from a host system communicatively coupled to the solid state drive, the commands including read, write, and erase commands;

control access to the non-volatile memory dies and reduce latency for random read workloads; and use firmware executed by the controller circuitry to:

prioritize host read commands for random read workloads, from among the received commands, over program operations for garbage collection; and control performance of the program operations for garbage collection independent of the host system.

2. The solid state drive of claim 1, wherein the controller circuitry to track logical block addresses included in the host read commands received from the host system to determine if a given host read command of the host read commands is for a random read workload.

3. The solid state drive of claim 1, wherein, the program operations for garbage collection can be paused if free space in the non-volatile memory dies is less than prior free space in the non-volatile memory dies by a threshold amount.

4. The solid state drive of claim 1, wherein the non-volatile memory dies are NAND dies.

5. The solid state drive of claim 4, wherein the controller circuitry to dynamically enable and disable the program operations for garbage collection such that the program operations for garbage collection continue to be performed while ensuring there is a sufficient number of unwritten blocks available in the NAND dies.

6. The solid state drive of claim 1, wherein the controller circuitry to minimize the program operations for garbage collection by reducing frequency of the program operations for garbage collection.

7. The solid state drive of claim 1, wherein the controller circuitry to increase a time period between the program operations for garbage collection.

8. A method comprising:

storing data in a plurality of non-volatile memory dies;

receiving, by controller circuitry of a solid state drive, commands to perform operations in the solid state drive from a host system communicatively coupled to the solid state drive, the commands including read, write, and erase commands;

controlling, by the controller circuitry, access to the plurality of non-volatile memory dies;

prioritizing, by the controller circuitry, host read commands for random read workloads, from among the received commands, over program operations for garbage collection to reduce latency for random read workloads; and controlling performance of the program operations for garbage collection independent of the host system.

9. The method of claim 8, wherein the controller circuitry to track logical block addresses included in host read commands received from the host system to determine if a host read command is for a random read workload.

10. The method of claim 8, wherein the program operations for garbage collection can be paused if free space in the plurality of non-volatile memory dies is less than prior free space in the plurality of non-volatile memory dies by a threshold amount.

11. The method of claim 8, wherein the plurality of non-volatile memory dies are NAND dies.

12. The method of claim 11, wherein the controller circuitry to dynamically enable and disable the program operations for garbage collection such that the program operations for garbage collection continue to be performed while ensuring there is a sufficient number of unwritten blocks available in the NAND dies.

13. The method of claim 8, wherein the controller circuitry to minimize the program operations for garbage collection by reducing frequency of the program operations for garbage collection.

14. The method of claim 8, wherein the controller circuitry to increase a time period between the program operations for garbage collection.

15. A system comprising:

a processor; and a solid state drive comprising:

non-volatile memory dies to store data;

controller circuitry in the solid state drive to:

receive commands to perform operations in the solid state drive from a host system communicatively coupled to the solid state drive, the commands including read, write, and erase commands;

control access to the non-volatile memory dies and reduce latency for random read workloads; and firmware executed by the controller circuitry to:

prioritize host read commands for random read workloads, from among the received commands, over program operations for garbage collection; and control performance of the program operations for garbage collection independent of the host system.

16. The system of claim 15, wherein the controller circuitry to track logical block addresses included in host read commands received from the processor to determine if a host read command is for a random read workload.

17. The system of claim 15, wherein the program operations for garbage collection can be paused if free space in the non-volatile memory dies is less than prior free space in the non-volatile memory dies by a threshold amount.

18. The system of claim 15, wherein the non-volatile memory dies are NAND dies.

19. The system of claim 18, wherein the controller circuitry to dynamically enable and disable the program operations for garbage collection such that the program operations for garbage collection continue to be performed while ensuring there is a sufficient number of unwritten blocks available in the NAND dies.

20. The system of claim 15, further comprising one or more of:

a display communicatively coupled to the processor; or a battery coupled to the processor.

* * * * *